Sept. 20, 1927.  G. A. MILLER  1,643,079
POULTRY ROOST
Filed Jan. 31, 1927

Inventor
G. A. Miller,
By Milo B. Stevens & Co.
Attorney

Patented Sept. 20, 1927.

1,643,079

UNITED STATES PATENT OFFICE.

GEORGE A. MILLER, OF TAMAROA, ILLINOIS.

POULTRY ROOST.

Application filed January 31, 1927. Serial No. 164,909.

My invention relates to improvements in roosts for chickens and other fowls and its object is to provide a means whereby lice, mites and other vermin, which prey upon the fowls at night, may be conveniently destroyed.

More specifically expressed, it is the object of this invention to provide a day hiding place for mites and other vermin,—this hiding place being formed in the roost itself and the relative arrangement being such that hot water or fluid can be poured into the hiding place to kill the vermin.

The invention also has for an object to provide a roost as characterized, wherein the vermin hiding place is so formed and arranged as to obviate the necessity of the provision of a closure or other adjunct to shut off light from the hiding place and give the vermin a sense or feeling of security.

The foregoing and other objects are attained by a novel combination and arrangement of parts to be hereinafter described and claimed, and in order that the same may be better understood reference is had to the accompanying drawing forming a part of this specification.

Figure 1:
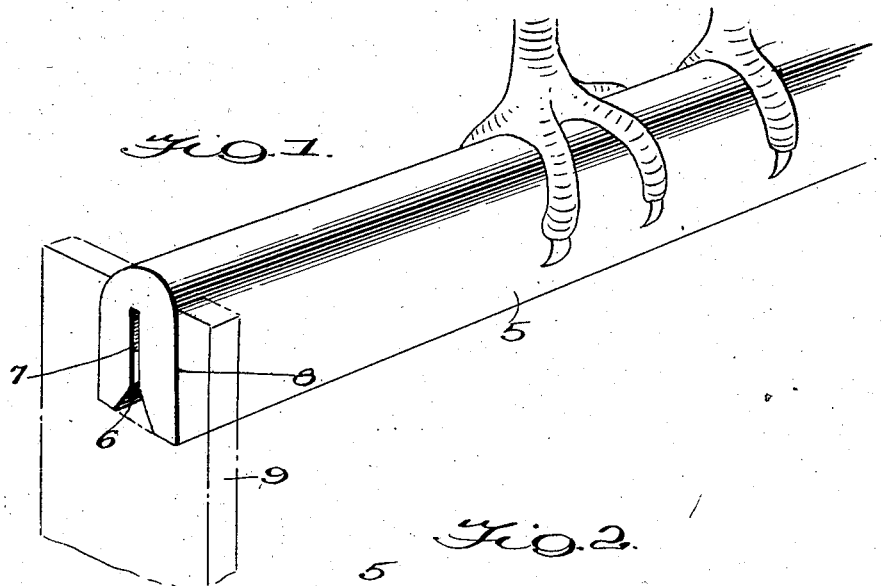
Figure 1 is a perspective view illustrating a roost constructed in accordance with my invention.
Figure 2:
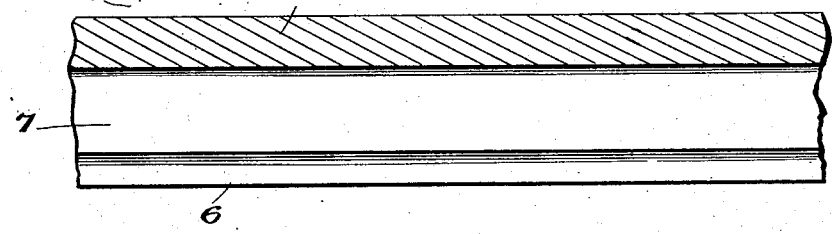
Figure 2 is a fragmentary longitudinal section through the roost.
Figure 3:
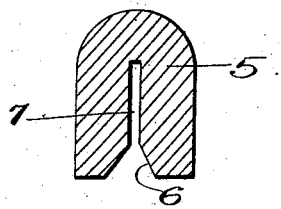
Figure 3 is a cross section through the roost.

Referring specifically to the drawing, wherein the same reference characters designate the same parts in all views, numeral 5 denotes the roost itself the upper portion of which is rounded, as usual, to better enable the fowls to secure a foot hold thereon. The lower edge of the roost 5 is cut with a V-shaped notch or recess 6 which is coextensive in length with the roost. This recess 6 communicates with a relatively deep and narrow groove 7, which as shown, extends nearly to the rounded side of the roost.

By reason of the flared V-shaped recess 6 the mites and other vermin upon leaving the fowls in the morning are attracted into the restricted groove 7 which constitutes a day hiding place for the vermin. It is pointed out that since the groove is very narrow and relatively deep no light will penetrate thereinto, the result being the vermin have the same sense of security as they would have were a cover or other closure positioned over or substantially over their refuge.

When it is desired to destroy the vermin in the groove 7 it is only necessary that the roost be lifted from its supporting notches and hot water poured into the V-shaped recess 6 at one end thereof. The hot water, of course, flows down the groove 7 killing the vermin and washing them completely out of their refuge. Not only does the V-shaped recess 6 attract the vermin to the groove 7, but also it facilitates the pouring of the hot water and renders it possible to pour a sufficient quantity of water at once to assure the washing of the vermin from the groove 7.

The bar 5 has its ends removably supported in the notches 8 of frame members 9 whereby the bar can be readily inverted to permit water to be poured into the V-shaped groove or recess 6 to flow through the same and the restricted groove 7. Of course the roost supporting frame 9 may have any number of bars 5 and other means of movably supporting the same may be availed of.

Having thus described my invention, what I claim as new and desire to secure by Letters Patent is:

A fowl roost comprising a bar having in its undersurface a longitudinal groove of V-shaped cross section coextensive in length with the bar, the walls of the groove flaring outwardly toward the sides of the bar; the undersurface of the bar also having a very deep and narrow parallel-walled channel opening from the apex of said V-shaped groove and coextensive in length therewith; the V-shaped groove providing a wide unavoidable, well lighted, clearly defined and gradually darkening entry way for vermin to reach the darkened confines of said channel; and the groove when the bar is inverted defining a trough of sufficient depth and cross sectional area to carry a heavy stream of insect destroying fluid of such volume as to assure the full penetration thereof into the confines of said channel to kill the vermin therein and wash them therefrom.

In testimony whereof I affix my signature.

GEORGE A. MILLER.